United States Patent [19]

Flower

[11] 4,274,575
[45] Jun. 23, 1981

[54] METHOD OF MANUFACTURING BRUSH SEALS

[76] Inventor: Ralph F. J. Flower, "Littledean", Bath Rd., Devizes, England

[21] Appl. No.: 43,887

[22] Filed: May 30, 1979

[30] Foreign Application Priority Data

May 31, 1978 [GB] United Kingdom ............... 24737/78

[51] Int. Cl.³ ............................................. B23K 31/02
[52] U.S. Cl. ..................................... 228/160; 29/423;
  29/445; 228/178; 228/212; 277/53; 415/174
[58] Field of Search ...................... 29/423, 445, 469.5;
  228/159, 160, 178, 212; 277/53, 95, 227;
  415/174; 300/21

[56] References Cited

U.S. PATENT DOCUMENTS

| | | | |
|---|---|---|---|
| 885,032 | 4/1908 | Ferranti | 277/95 X |
| 1,713,027 | 5/1929 | Cleaves | 300/21 X |
| 2,672,640 | 3/1954 | Peterson et al. | 300/21 X |
| 2,878,048 | 3/1959 | Peterson | 277/227 |
| 3,050,891 | 8/1962 | Thomsen et al. | 228/173 X |
| 3,239,276 | 3/1966 | Charvat | 300/21 |
| 3,314,095 | 4/1967 | Prange | 300/21 X |
| 3,440,907 | 4/1969 | Wrench | 300/21 X |
| 3,519,282 | 7/1970 | Davis | 277/53 X |
| 3,807,620 | 4/1974 | Paquette | 228/47 |
| 3,917,150 | 11/1975 | Ferguson et al. | 228/159 |

FOREIGN PATENT DOCUMENTS 1568312  4/1969  France .
839731  6/1960  United Kingdom .

*Primary Examiner*—Charlie T. Moon
*Attorney, Agent, or Firm*—Emory L. Groff, Jr.

[57] ABSTRACT

A method of manufacturing a brush seal for effecting a seal between relatively moving parts. Brush elements are first made by assembling bundles of bristle elements in holding tubes therefor, the brush elements then being mounted for instance by an adhesive on a carrier, so as to lie at the required disposition. The free end portions of the bristle elements are affixed to a brush seal root member, and the bristle elements are cut off at the required position between the root member and the carrier; the carrier and holding tubes—which may be re-used—are removed to leave the brush seal. A final machining of the brush seal, such as of the bristles, may be performed.

14 Claims, 10 Drawing Figures

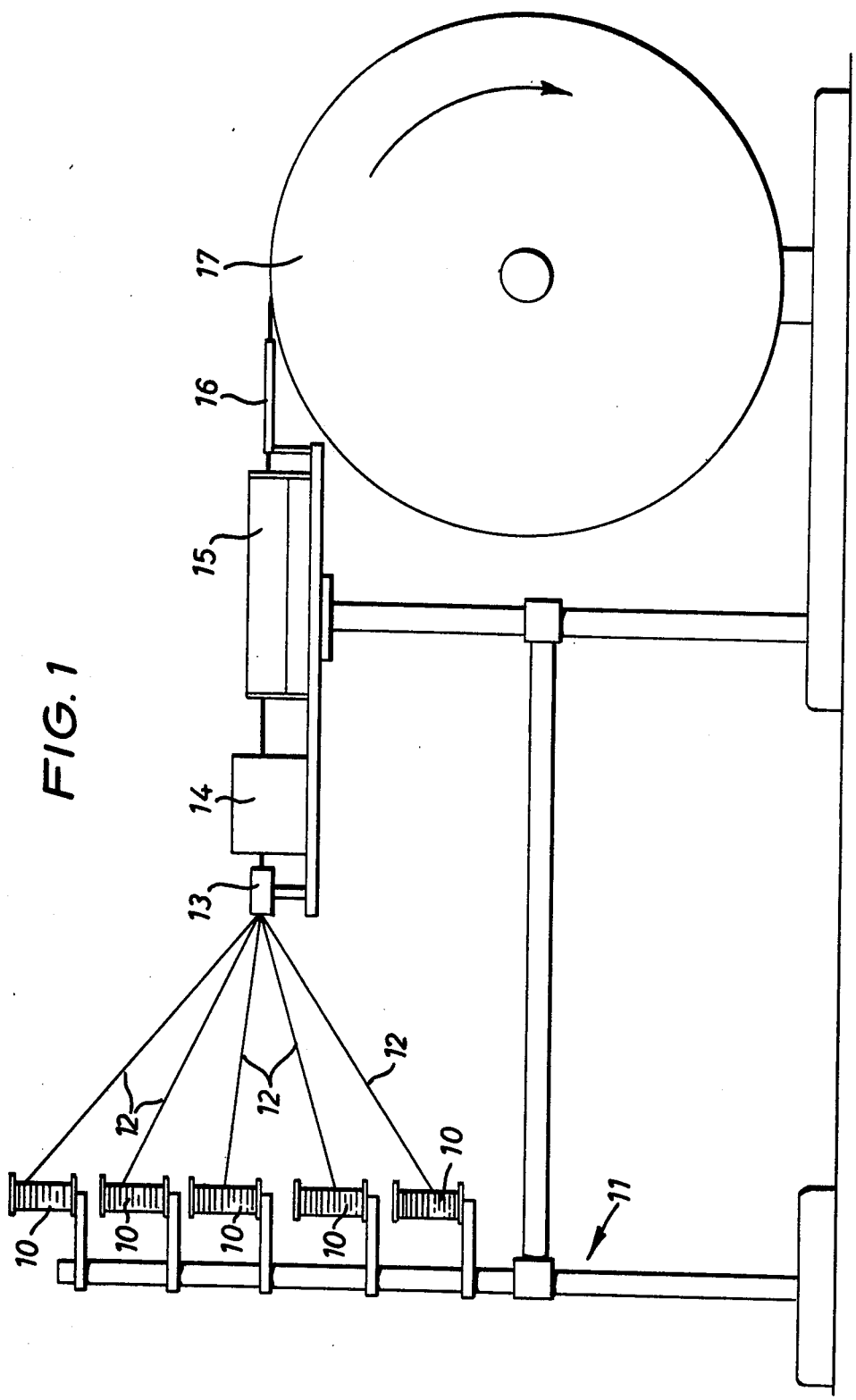

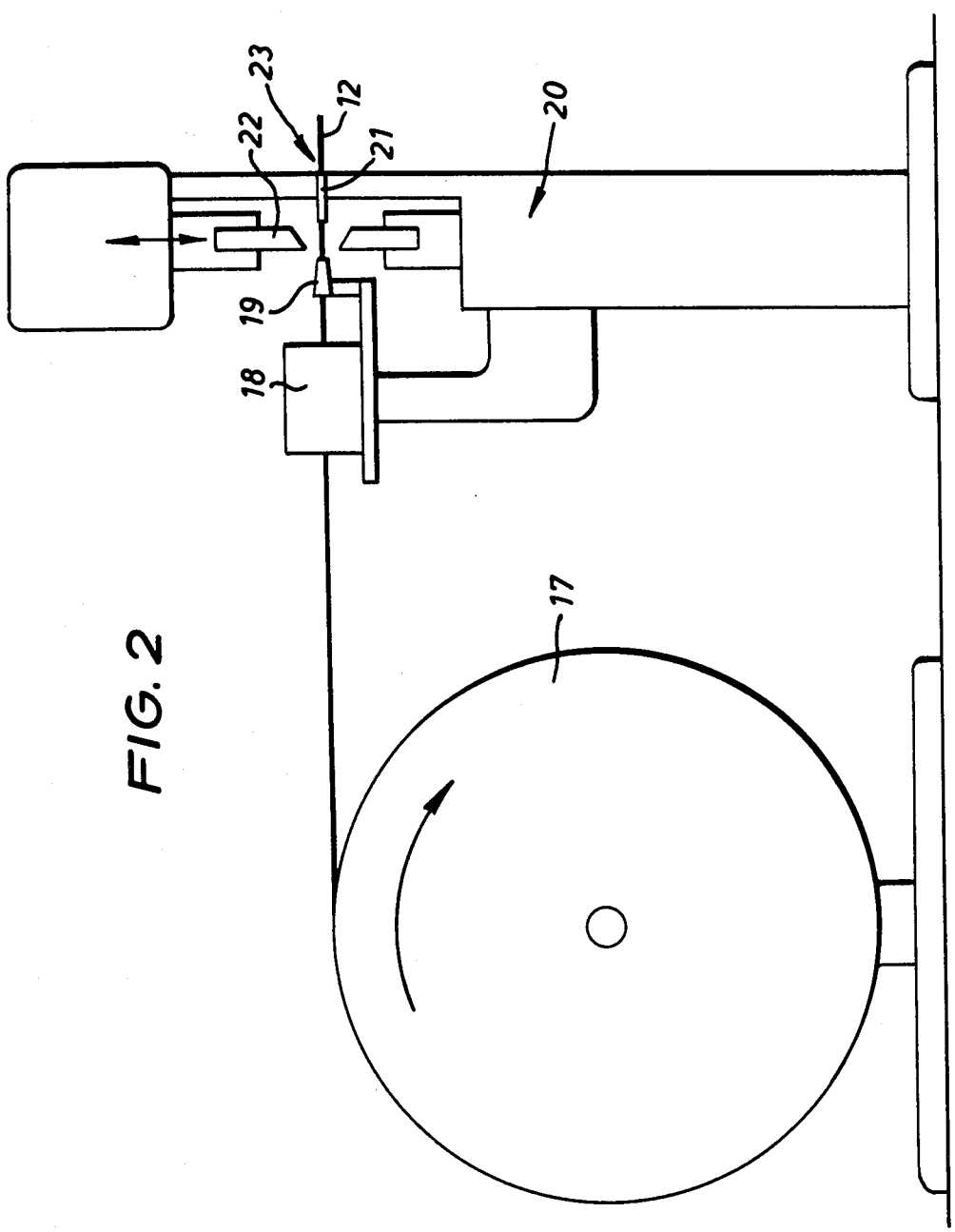

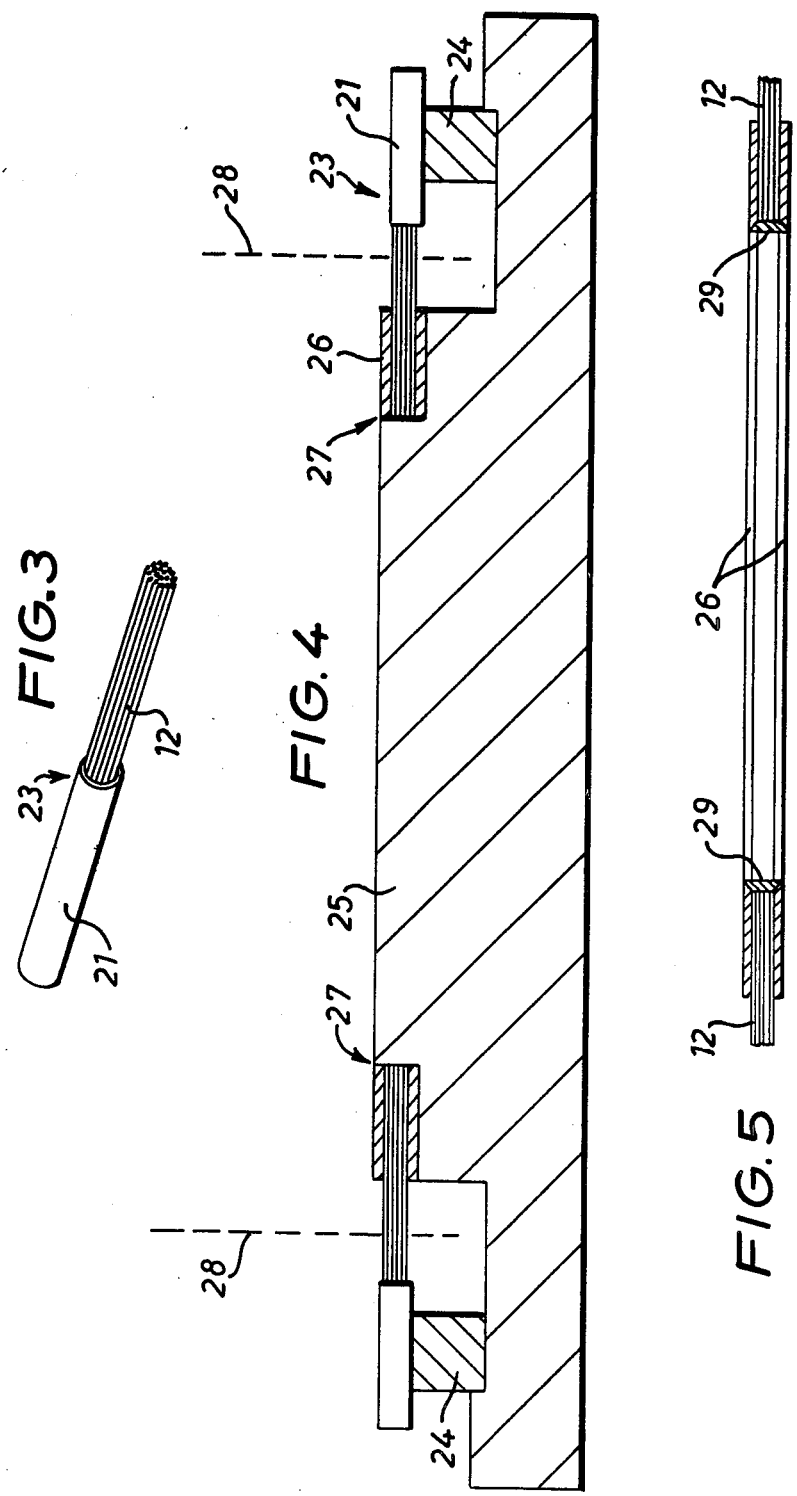

METHOD OF MANUFACTURING BRUSH SEALS

BACKGROUND OF THE INVENTION (a) Field of the Invention

This invention relates to brush seals and particularly to an improved method of manufacture and assembly of the components making up such a brush seal. The invention, although not limited thereto, is applicable to the manufacture of brush seals for use in machines between two relatively moving parts, or a moving part and a static part, for example between a rotor and a stator such as of a gas turbine and, in such an application, the seal will be of circular—i.e. annular—form. In a preferred form the invention relates to the manufacture of wire brush seals for machine parts, and to such seals themselves.

(b) Description of the Prior Art

A method of manufacturing wire brush seals is described in the Specification of British Pat. No. 1,450,553. In the method therein described, bundles of small diameter wire bristles are pulled through holes in a backing plate by means of looped wires and successive bundles wired together to form a brush, the brush so made is held between clamping rings, the radially outer ends of the bristles are welded, and the rings and wire ends of the bristle mountings are then machined away.

OBJECTS OF THE INVENTION

The present invention has been devised with the primary object of simplifying the manufacture of brush seals to a pre-selected width, bristle length and brush attitude (by "attitude" is meant the angle at which the bristles of the brush lie when relaxed, relative to a mounting therefor) minimising finishing operations for the seal.

It is a further object of this invention to provide a method of assembling bristles into bundles for incorporation into a finished brush seal.

Yet another object of this invention is to provide an improved finishing process for a brush seal, to give a seal of uniform thickness by machining at least one of the inner and outer surfaces of the seal.

SUMMARY OF THE INVENTION

According to this invention, there is provided a method of manufacturing a brush seal, which comprises the steps of:

(a) assembling a multiplicity of bristle elements in a holding tube with said bristle elements projecting from the holding tube by a pre-set distance thereby forming a brush element;

(b) assembling a plurality of said brush elements on a carrier with the brush elements lying at pre-set angles;

(c) affixing to a root member the free end portions of said bristle elements projecting from their holding tubes;

(d) severing all said bristle elements part-way between their holding tubes and the root member so that the severed bristle elements project for a predetermined distance from said root member; and (e) removing said carrier with said holding tubes, leaving a brush seal with projecting bristles.

BRIEF DESCRIPTION OF THE DRAWINGS

In order that the invention may better be understood, it will now be described in greater detail, reference being made to the accompanying drawings, which illustrate a specific manufacturing method of a brush seal according to this invention. In the drawings:

FIG. 1 illustrates, diagrammatically, a method of forming a multiplicity of wire strands into a continuous bundle;

FIG. 2 illustrates the assembly of a holding tube carrying a multiplicity of wire bristles formed from the bundle of wire strands;

FIG. 3 is an enlarged detail of a holding tube with bristles projecting therefrom;

FIG. 4 illustrates the assembly of a plurality of holding tubes mounted on a carrier with a pair of annular root plates, during the formation of a seal element;

FIG. 5 is a section through a finished ring seal;

DESCRIPTION OF THE PREFERRED EMBODIMENTS

Figure 6:
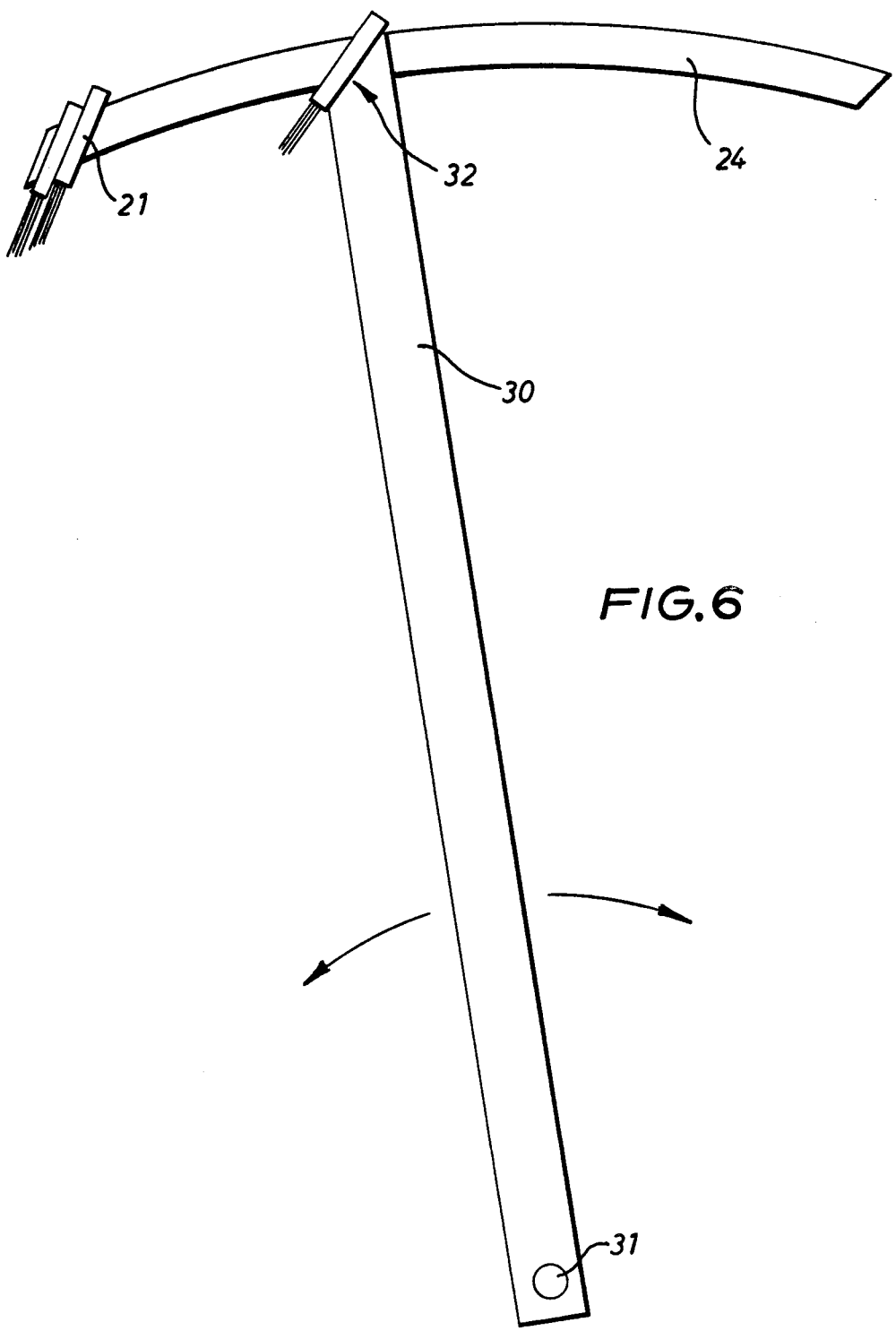
FIG. 6 shows the use of a reference arm for positioning brush elements at a designated angle.
Figure 7:
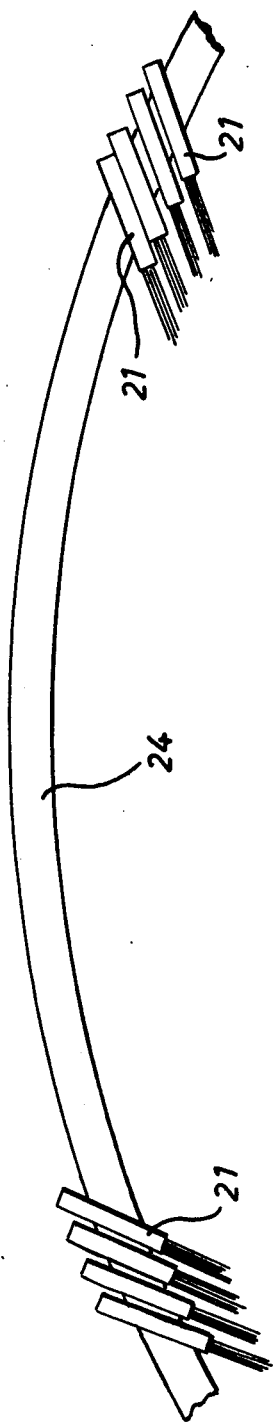
FIG. 7 shows a series of brush elements assembled on a carrier.

The manufacturing method of this invention for a brush seal will now be described in detail.

Because neither the carrier nor the holding tubes form parts of the finished brush seal, it is convenient for the holding tubes to be attached to the carrier by means of an adhesive, so that the tubes can be recovered and re-used once the manufacture of a brush seal has been completed. Each brush element comprising a holding tube with projecting bristle elements can be positioned on the carrier with the aid of a reference arm having an abutment face which engages each brush element in turn to position that brush element at the required angle relative to the carrier, and preferably with adjacent holding tubes in direct contact, to ensure that all the bristle elements lie at the required attitude. In the case in which an annular brush seal is to be made, the carrier is preferably of arcuate or annular form, and the reference arm is pivotally mounted about the centre of curvature of the carrier.

Preferably the root member is in the form of two plates between which the free end portions of the bristle elements are located. The plates may be flat, or may have other shapes such as L or Z-sections, to suit the final application of the seal. The bristle elements may be formed of metallic wire and when the root member also is metallic, the bristle elements may be affixed to the root member by a welding process, or by other appropriate processes such as brazing. The assembly of the brush elements is preferably performed by feeding a multiplicity of strands of metallic wire from a series of spools thereof through a first guide nozzle into a tensioning device, and thence through a tube heater and finally through a second guide nozzle, prior to insertion into the holding tubes. For convenience in manufacture, the assembled bristle elements can be spooled following their passage through the second guide nozzle, the elements subsequently being drawn from a spool thereof when required for forming the brush elements by being inserted into the holding tubes. In this case, the bristle elements can be drawn from the spool thereof by a feed unit and thence through a further guide nozzle into a holding tube, the bristle elements then being cut off to the required length to form a brush element.

Most commonly the brush seals of this invention will be of annular form, for sealing between a rotating part and a stationary part. For such a seal, the bristles of the finished seal may be directed outwardly or inwardly, as convenient. In either case, the seal may be subjected to a finished operation in which at least one of the inside and outside diameters of the seal is machined, following removal of the carrier and holding tubes, to ensure concentricity of the brush seal. Such machining may be performed by positioning the brush seal between at least two rollers one of which is fixed and arranged to provide a reference surface and the other of which is adapted resiliently to bear on the brush seal to hold the seal against the fixed roller, rotating at least the fixed roller to rotate the brush seal, and machining the brush seal during the rotation thereof to a substantially constant radial thickness. It is convenient to perform the machining by means of a centreless electro-discharge machine, or by means of a centreless bore grinding machine.

The manufacturing steps outlined above will now be explained with specific reference to the production of an annular brush seal having metallic wire bristles, referring to FIGS. 1 to 7 of the drawings.

In the machine illustrated in FIG. 1, a series of bobbins 10 are rotatably mounted on a frame generally designated by the reference numeral 11, each of the bobbins supplying a strand 12 of wire bristle material to a first guide nozzle 13, also mounted on the frame. In the first guide nozzle 13, the strands are brought together, and then pass, in sequence, through a tensioning device 14, a tube heater 15 and a second guide nozzle 16, the assembled strands finally being wound on a spool 17. Subsequently, the spool 17 is taken to the machine illustrated in FIG. 2, where the assembled strands 12 are drawn from the spool 17, mounted on the machine frame, by a feed unit 18 which supplies the strands through a guide nozzle 19, held on a pillar 20, into a holding tube 21. The strands are then severed by a cutter 22 to a required length, to provide a brush element 23 comprising a holding tube furnished with multiple strands of bristles 12 projecting therefrom, as shown in detail in FIG. 3. A plurality of such brush elements 23 are manufactured in this way.

When manufacturing a circular brush seal with outwardly-directed bristles, the brush elements (FIG. 3) are affixed to an annular carrier, for example by bonding the holding tubes to the carrier with an adhesive, with the bristles 12 projecting inwardly of the carrier. As shown in FIG. 4, the carrier 24 with the brush elements 23 affixed thereto is then fitted to a jig 25, which also carries a pair of annular root plates 26 disposed so that the radially inner end portions of the bristles 12 are positioned therebetween. The bristles are all then slid radially inwardly through their holding tubes so that the radially inner ends abut a cylindrical face 27 of the jig 25, thereby similarly positioning all the bristles. The plates 26 are clamped together firmly to hold the bristles, and then all the bristles are severed part-way between the holding tubes 21 and the plates 26, as shown at 28. The carrier can now be removed, and, if of a suitable material, the holding tubes 21 recovered and re-used.

The plates 26 carrying the bristles 12 cut to the required length are removed from the jig 25, and the plates and bristles united by welding, as shown at 29 in FIG. 5. The brush seal thus produced may be usable in that form, or may be subjected to a finishing machining operation, as described below.

In order to facilitate the assembly of the brush elements 23 on the carrier 24 at the required disposition, a jig including a reference arm such as is shown in FIG. 6 may be employed. In the arrangement shown in this Figure, the carrier 24 is in the form of a segment of a circle and is held in the jig such that the reference arm 30 is pivotted at the centre of curvature of the arm. At the end of the arm remote from its pivot 31, the carrier has a reference abutment face 32 cut at a suitable angle to serve a correct reference for positioning the tubes 31 of the brush elements at the required angle on the carrier 24. In this way, a plurality of brush elements can be assembled on the carrier, and by making several such carriers, a complete circular assembly can be produced, which complete assembly is then mounted in the jig 25, as described above. The seal shown in FIG. 5 is an annular brush seal, but of course arcuate seals could be made in the same manner, or even linear or other shaped seals, by providing suitably shaped carriers, assembly jigs and so on. Moreover, the root plates can be of various shapes, so that the base portion of the seal, from which the bristles project, may have any desired cross-sectional shape, such as of square, rectangular, circular of elliptical shapes, or L or Z-shapes.

Figure 8:
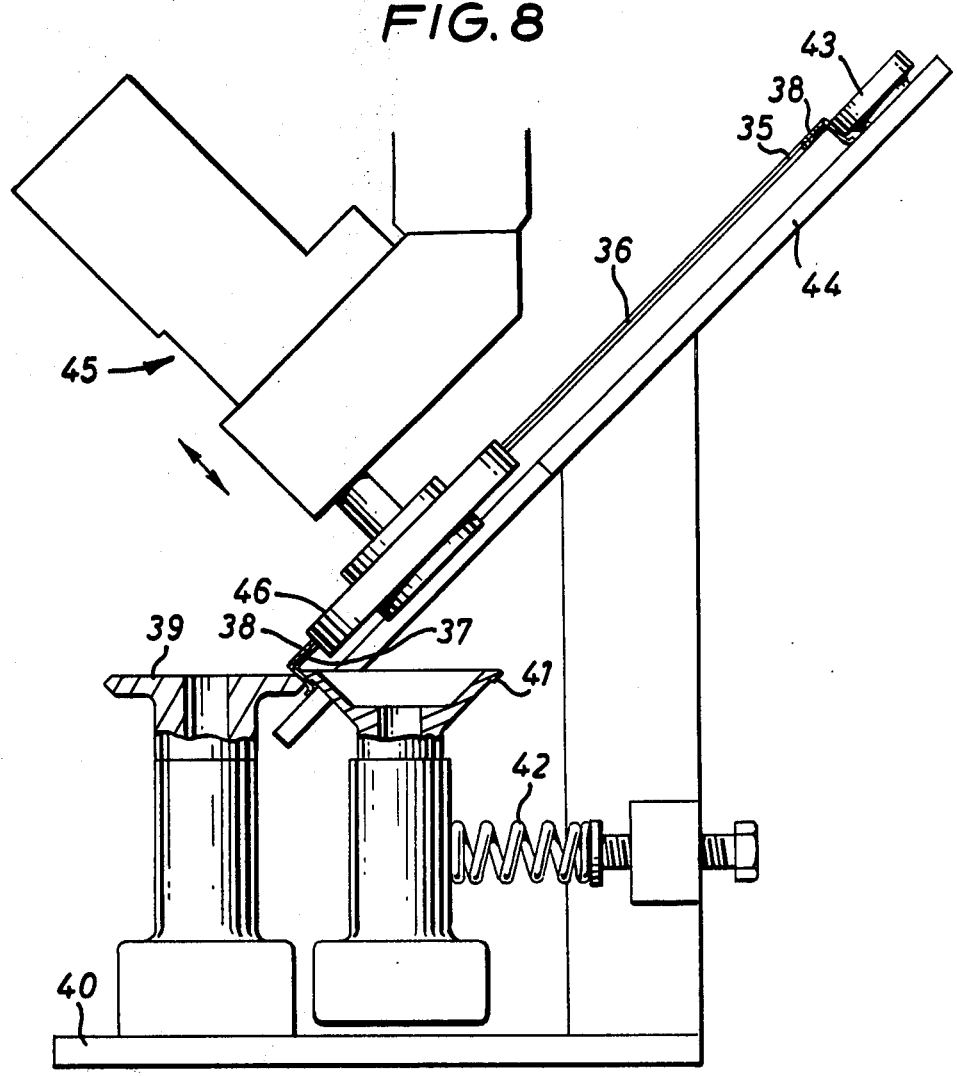
FIG. 8 shows a finishing operation being performed on a brush seal, using a centreless electro-discharge machine.
Figure 9:
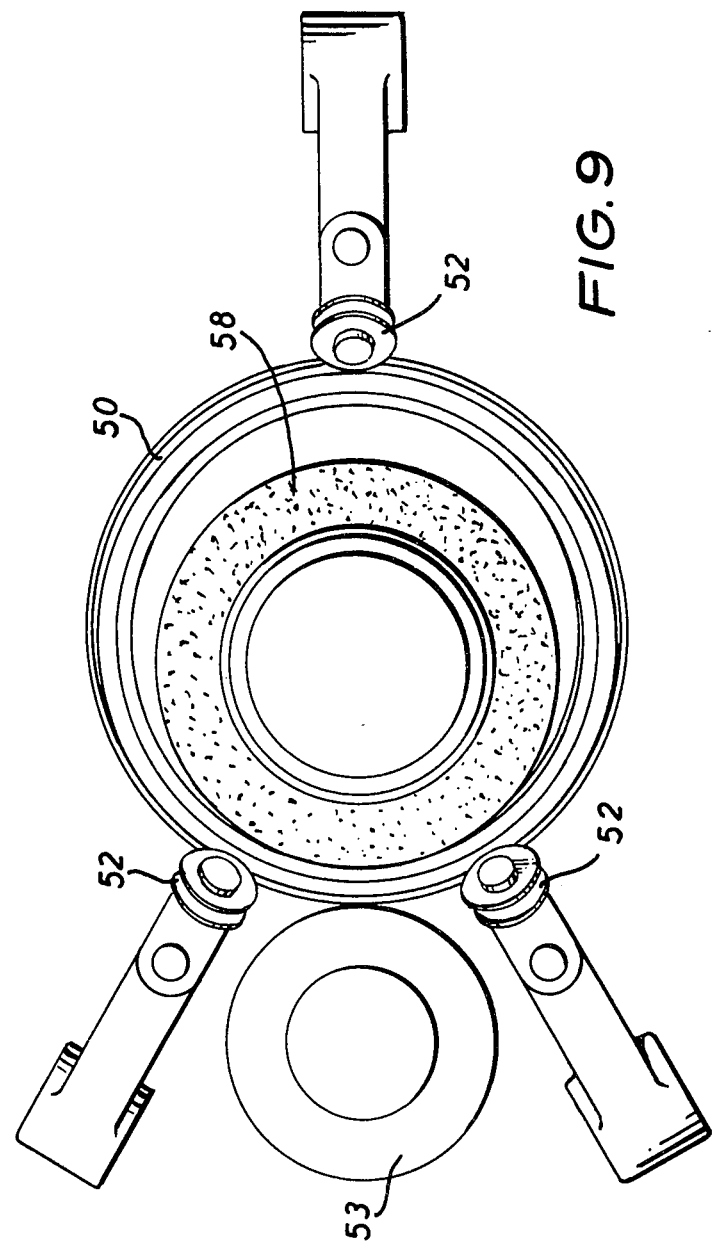
FIGS. 9 and 10 respectively show a plan view and a vertical section through parts of a centreless bore grinding machine for finishing a brush seal.
Figure 10:
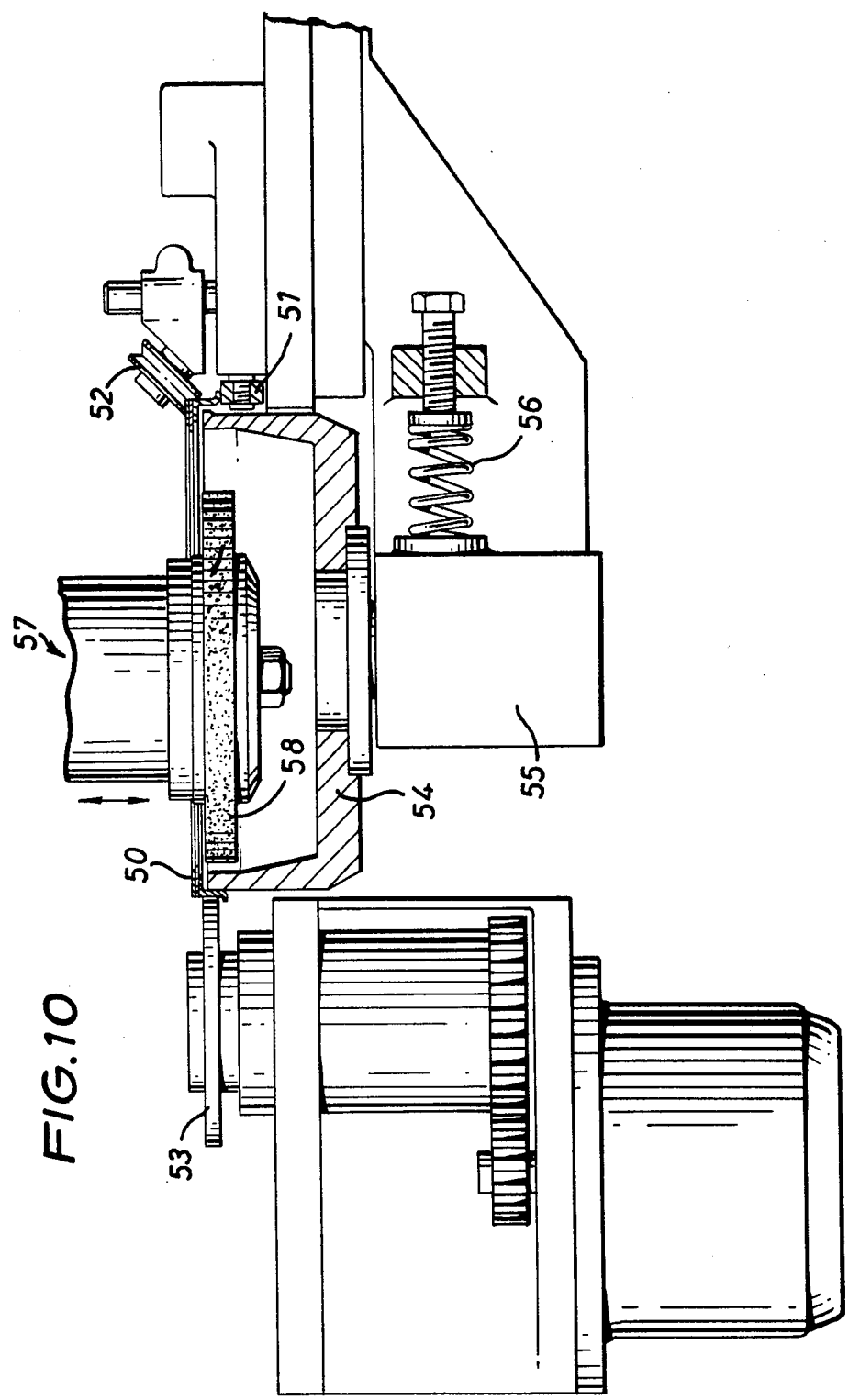

Though a seal as described above and as illustrated in FIG. 5 may be used without further finishing, it may at times be required to machine the seal accurately to a finished size; this may be performed on the apparatus shown in FIG. 8 or FIGS. 9 and 10 to ensure that the seal has a substantially constant radial thickness. Referring to FIG. 8, there is shown a centreless electro-discharge machine adapted for machining the bristles 35 of an annular brush seal 36 having one root plate 37 generally of Z-section, the other root plate 38 being generally flat and the bristles projecting inwardly of the seal. The seal 36 is supported between a fixed position driving roller 39 rotatably mounted on the machine frame 40, and a further driving roller 41 which is urged by means of a spring 42 towards the roller 39. Guide rollers 43 are disposed around a support plate 44 also mounted on the machine frame 40, to support and assist movement of the seal 36. The rollers 39 and 41 are both driven by a motor (not shown) through suitable gearing (also not shown) so as to effect rotation of the seal 36 about its axis. The machine includes an electro-discharge head 45 having a circular rotatable electrode 46, the head being appropriately mounted on the machine frame for movement both vertically and parallel to the axis of rotation of the electrode 46. A tank (not shown) surrounds the part of the machine where the discharge takes place, for curtaining an appropriate dielectric liquid.

In operation, the brush seal 36 is rotated by driving the rollers 39 and 41, whilst the bristles are machined by the rotating electrode 46. As the seal rotates, the electrode 46 is caused to reciprocate about its own axis, whilst the spark gap automatically is servo-controlled by vertical movememt of the head. It is preferred to position the general plane of the seal 36 at an angle to the horizontal—such as at 45°, as shown—in order to help the servo-action of the cutting electrode in sensing the bore of the seal as the seal is rotated. Normally the cutting electrode will be immersed in a dielectric liquid, a suitable electrode being made, for example, of carbon, copper or a copper alloy. The outer diameter of the seal may be machined in a generally similar manner, as may seals having root plates of shapes other than those shown in FIG. 8.

Referring now to FIGS. 9 and 10, there is shown a vertical centreless bore grinding machine being used to finish the bristles of a seal 50 generally similar to seal 36 shown in FIG. 8. The seal is carried by three support rollers 51 (only one of which can be seen in FIG. 10), idler rollers 52 running on the periphery of the seal to hold it in the required position. A drive roller 53 is urged into engagement with the periphery of the seal, and is power-driven by means of a motor (not shown) operating through a suitable gear train. A control wheel 54 is rotatably mounted on a sub-frame 55 urged by a spring loading mechanism 56 towards the drive roller 53, the control wheel engaging an internal face of the seal root plate to urge the seal into engagement with the drive roller 53, so that the seal will be rotated about its axis on operation of the machine.

A grinding head 57 including a power-driven grinding wheel 58 is mounted on the machine, for vertical movement relative to the supported seal 50. In operation, the seal is rotated by driving the roller 53 whilst the grinding wheel 58 is rotated and the grinding head 57 is reciprocated vertically. In this way, the internal bore can be ground accurately, so that the radial thickness of the seal is substantially constant.

What is claimed is:

1. A method of manufacturing a brush seal, which method comprises the steps of:
    (a) assembling a multiplicity of bristle elements in a holding tube with said bristle elements projecting from the holding tube by a pre-set distance thereby forming a brush element;
    (b) assembling a plurality of said brush elements on a carrier with said brush elements lying at pre-set angles relative to said carrier;
    (c) affixing to a root member the free end portions of said bristle elements projecting from their holding tubes;
    (d) severing all said bristle elements part-way between their holding tubes and said root member so that said severed bristle elements project for a predetermined distance from said root member; and
    (e) removing said carrier with said holding tubes, leaving a brush seal with projecting bristles.

2. A method as claimed in claim 1, in which said holding tubes are attached to said carrier by means of an adhesive.

3. A method as claimed in claim 1, in which said root member is in the form of two plates between which said free end portions of said bristle elements are located.

4. A method as claimed in claim 1, in which said bristle elements are formed of metallic wire and said root member also is metallic, said bristle elements being affixed to said root member by a welding process.

5. A method as claimed in claim 1, in which the assembly of said bristle elements is performed by feeding a multiplicity of strands of metallic wire from a series of spools thereof through a first guide nozzle into a tensioning device, and thence through a tube heater and finally a second guide nozzle, thereby assembling a multiplicity of the bristle elements for insertion into the holding tubes.

6. A method as claimed in claim 5, in which said assembled bristle elements are wound on to a spool following the passage thereof through the second guide nozzle, the elements subsequently being drawn from said spool when required for forming said brush elements.

7. A method as claimed in claim 6, in which said assembled bristle elements are drawn by a feed unit and are then fed through a further guide nozzle into a holding tube, said bristle elements then being cut off to the required length to form a brush element.

8. A method as claimed in claim 1, in which each said brush element is positioned on said carrier by means of a reference arm having an abutment face which face engages each brush element in turn to position that brush element at the required angle relative to the carrier.

9. A method as claimed in claim 8, in which the carrier is of arcuate form and said reference arm is pivotally mounted about the centre of curvature of said carrier.

10. A method as claimed in claim 9, in which said brush elements are disposed with the free ends of said bristle elements directed inwardly of said carrier whereby the finished brush seal has its bristles directed outwardly.

11. A method as claimed in claim 9, in which at least one of the inside and outside diameters of the seal is machined following removal of said carrier and holding tubes.

12. A method as claimed in claim 11, in which the machining is performed by positioning the brush seal between at least two rollers one of which rollers is fixed and arranged to provide a reference surface and the other of which rollers is adapted resiliently to bear on said brush seal to hold the seal against said fixed roller, rotating at least said fixed roller, to rotate the brush seal, and machining the brush seal during the rotation thereof to a substantially constant radial thickness.

13. A method as claimed in claim 11, in which said machining is performed by means of a centreless electro-discharge machine.

14. A method as claimed in claim 11, in which said machining is performed by means of a centreless bore grinding machine.

* * * * *